United States Patent
Iyer et al.

(10) Patent No.: US 8,621,405 B2
(45) Date of Patent: Dec. 31, 2013

(54) INCREMENTAL ELMORE DELAY CALCULATION

(75) Inventors: Mahesh A. Iyer, Fremont, CA (US); Amir H. Mottaez, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/485,600

(22) Filed: May 31, 2012

(65) Prior Publication Data

US 2013/0326449 A1    Dec. 5, 2013

(51) Int. Cl.
*G06F 17/50*    (2006.01)
*G06F 9/455*    (2006.01)

(52) U.S. Cl.
USPC ............................. 716/108; 716/113; 716/134

(58) Field of Classification Search
USPC ........................................ 716/108, 113, 134
See application file for complete search history.

(56) References Cited

U.S. PATENT DOCUMENTS

| | | | | |
|---|---|---|---|---|
| 5,359,535 A | * | 10/1994 | Djaja et al. ..................... | 716/113 |
| 5,703,798 A | * | 12/1997 | Dhar ............................... | 703/14 |
| 6,005,265 A | * | 12/1999 | Kuroda ......................... | 257/208 |
| 6,009,248 A | * | 12/1999 | Sato et al. ...................... | 716/114 |
| 6,606,587 B1 | * | 8/2003 | Nassif et al. .................... | 703/14 |
| 6,880,141 B1 | * | 4/2005 | Tetelbaum ..................... | 716/113 |
| 7,814,451 B2 | * | 10/2010 | Furnish et al. ................. | 716/100 |
| 8,332,793 B2 | * | 12/2012 | Bose .............................. | 716/114 |
| 8,347,249 B2 | * | 1/2013 | Alpert et al. ................... | 716/113 |
| 2003/0005398 A1 | * | 1/2003 | Cho et al. .......................... | 716/8 |
| 2008/0216038 A1 | * | 9/2008 | Bose ................................. | 716/8 |
| 2012/0096417 A1 | * | 4/2012 | Durbha et al. ................. | 716/103 |

* cited by examiner

*Primary Examiner* — Thuan Do
*Assistant Examiner* — Magid Dimyan
(74) *Attorney, Agent, or Firm* — Park, Vaughan, Fleming & Dowler LLP; Laxman Sahasrabuddhe (57) ABSTRACT

Systems and techniques for incrementally updating Elmore pin-to-pin delays are described. During operation, an embodiment receives a representation of a physical topology of a routed net that electrically connects a driver pin to a set of load pins. The embodiment then computes a set of incremental Elmore delay coefficients based on the representation. Next, using the Elmore delay coefficients, the embodiment computes a set of delays based on the representation, wherein each delay in the set of delays corresponds to a delay between the driver pin and a corresponding load pin in the set of load pins. As load pin capacitances change during circuit optimization, the set of incremental Elmore delay coefficients can then be used to update the delays between the driver pin and the load pins in a very computationally efficient manner.

20 Claims, 5 Drawing Sheets

INCREMENTAL ELMORE DELAY CALCULATION

BACKGROUND

1. Technical Field

This disclosure relates to electronic design automation (EDA). More specifically, this disclosure relates to incremental Elmore delay calculation.

2. Related Art

A physical design system comprises the placement of standard cells and macro cells, as well as routing of the nets that electrically connect the cells. A physical synthesis system optimizes a placed and routed netlist to satisfy user-specified constraints. These constraints could encompass several requirements including delay, area, power consumption, design rules, etc. Different types of routing techniques are also used in different phases of the physical synthesis. For example, during initial phases of physical synthesis, a virtual router may be used to compromise some accuracy for computation speed. During the later stages of physical synthesis, typically detailed routing with metal layer assignment is used to enable design closure. A physical synthesis system is often tightly coupled with static timing analysis and layout parasitic extraction.

Wires contribute to the delay of the circuit in several forms. Some of these include wire delay, delay induced on gates because of wire capacitance, crosstalk wire delay, etc. A popular wire delay model that is used in physical synthesis systems is the Elmore delay model, which was described in Elmore, W. C., "The transient response of damped linear network with particular regard to wideband amplifiers," J. Applied Physics, 19:55-63, 1948. Elmore delay is the first moment of the impulse response, and can be written as a closed form expression in terms of design parameters.

Some physical synthesis systems optimize a circuit by iteratively replacing a gate in the circuit design with other functionally equivalent gates from a library of gates. Each time the physical synthesis system replaces a gate with another gate, the wire delay in a net that is electrically connected to an input of the replaced gate can change because replacing a gate changes the input capacitance of the gate. However, computing the Elmore delay every time a gate is replaced is computationally expensive. Therefore, conventional physical synthesis systems either do not re-compute the wire delay or use approximate approaches to adjust the wire delay whenever a gate is replaced. Unfortunately, this causes the circuit optimization to output sub-optimal designs or to output designs that have too many timing violations.

SUMMARY

Some embodiments described herein provide systems and techniques for incrementally updating delays. During operation, an embodiment receives a representation of a physical topology of a routed net that electrically connects a driver pin to a set of load pins. Next, the embodiment computes a set of delays based on the representation, wherein each delay in the set of delays corresponds to a delay between the driver pin and a corresponding load pin in the set of load pins. The embodiment then computes a set of incremental Elmore delay coefficients based on the representation. The set of incremental Elmore delay coefficients can then be used to update the delays between the driver pin and the load pins in a computationally efficient manner.

For example, in some embodiments, a change in a capacitance of a load pin in the set of load pins is received. Next, a set of incremental delay adjustments are computed based on the change in the capacitance and the set of incremental Elmore delay coefficients, wherein each incremental delay adjustment is computed by multiplying a corresponding incremental delay coefficient with the change in the capacitance. The embodiments can then update the set of delays by adding each incremental delay adjustment in the set of incremental delay adjustments to a corresponding (original) delay in the set of delays. This incremental delay adjustment essentially has the effect of subtracting from the original delay, only the delay component corresponding to the old pin capacitance associated with the changing pin, and adding to the original delay, only the delay component corresponding to the new pin capacitance associated with the changing pin.

In some embodiments described herein, updating a delay involves performing the following three operations: (1) an array lookup operation to identify the appropriate incremental delay coefficient, (2) a multiplication operation to compute an incremental delay adjustment by multiplying the incremental delay coefficient with a change in the capacitance, and (3) an addition operation to add the incremental delay adjustment to the original delay. Note that operations (2) and (3) can be skipped if the incremental delay coefficient that is looked up in (1) is zero, i.e., in this case the Elmore pin-to-pin delay in question remains unchanged. (Conventional approaches that re-compute the Elmore delay require significantly more than the above-described three operations.)

Some embodiments described herein improve the accuracy of circuit optimization. Some embodiments described herein typically start with an initial circuit design (logical or physical circuit design). Next, the embodiments identify a gate in the circuit design for optimization depending on the parameters that are desired to be optimized. Once a gate has been identified for optimization, some embodiments perform an iterative optimization loop. In each iteration of the optimization loop, the identified gate (and possibly its neighboring gates) is (are) transformed. In some embodiments described herein, transforming a gate involves replacing the gate with another functionally equivalent gate from a library of gates. In other embodiments, transforming a gate involves (1) replacing a gate with an equivalent circuit (e.g., replacing a NAND gate with an AND gate followed by an inverter), and then (2) replacing the gates in the circuit with other functionally equivalent gates from a library of gates. Other optimization tricks like buffering or repeater insertion also size the relevant gates appropriately. The library of gates typically contains a set of functionally equivalent gates that have different area, leakage, and delay characteristics. Each time a gate is transformed, embodiments described herein determine a change in the input capacitance of each input pin of the transformed gate, and then update wire delays using the set of incremental Elmore delay coefficients for all the nets connected to these input pins of the transformed gate. The updated wire delays are then used for computing timing metrics, and for accepting/rejecting the gate transformation based on whether or not the timing metrics degrade. Embodiments described herein increase the accuracy of the physical synthesis system without significantly impacting performance because these embodiments enable the physical synthesis system to accurately update wire delays using a highly efficient computation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Figure 1:
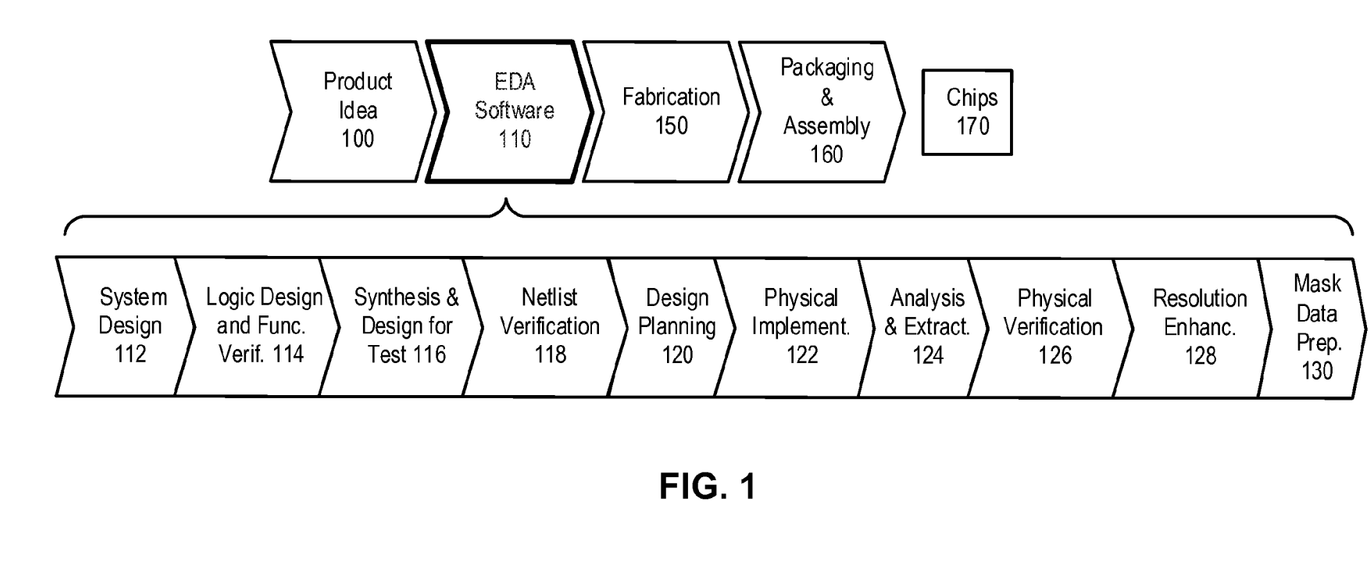
FIG. 1 illustrates various stages in the design and fabrication of an integrated circuit.

FIG. 1 illustrates various stages in the design and fabrication of an integrated circuit.

The process can start with a product idea (step 100) which can be realized using an integrated circuit that is designed using an EDA software (step 80). After the integrated circuit design is finalized, it can undergo a fabrication process (step 150) and a packaging and assembly process (step 160) to produce chips 170.

The EDA process (step 80) comprises steps 82-130, which are described below for illustrative purposes only and are not meant to limit the present invention. Specifically, the steps may be performed in a different sequence than the sequence described below.

During system design (step 82), circuit designers can describe the functionality that they want to implement. They can also perform what-if planning to refine functionality, check costs, etc. Hardware-software architecture partitioning can also occur at this stage. During logic design and functional verification (step 84), the HDL (hardware description language), e.g., SystemVerilog, code for modules in the system can be written and the design can be checked for functional accuracy, e.g., the design can be checked to ensure that it produces the correct outputs.

During synthesis and design for test (step 86), the HDL code can be translated to a netlist. Further, the netlist can be optimized for the target technology, and tests can be designed and implemented to check the finished chips. During netlist verification (step 88), the netlist can be checked for compliance with timing constraints and for correspondence with the HDL code.

During design planning (step 120), an overall floorplan for the chip can be constructed and analyzed for timing and top-level routing. During physical implementation (step 122), circuit elements can be positioned in the layout (placement) and can be electrically coupled (routing).

During analysis and extraction (step 124), the circuit's functionality can be verified at a transistor level and parasitics can be extracted. During physical verification (step 126), the design can be checked to ensure correctness for manufacturing, electrical issues, lithographic issues, and circuitry.

During resolution enhancement (step 128), geometric manipulations can be performed on the layout to improve manufacturability of the design. During mask data preparation (step 130), the design can be "taped-out" to produce masks which are used during fabrication.

Figure 2A:
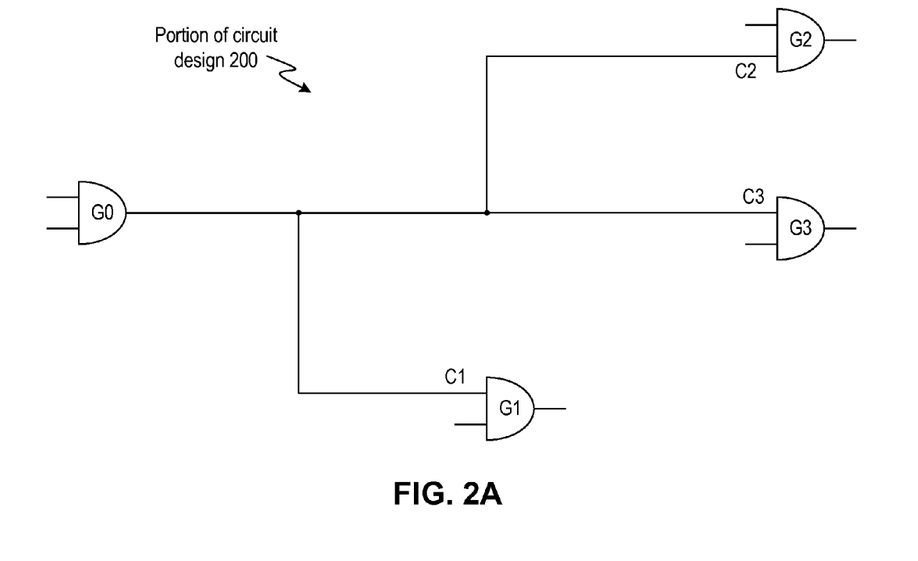
FIG. 2A illustrates a portion of a circuit design accordance with some embodiments described herein.

FIG. 2A illustrates a portion of a circuit design accordance with some embodiments described herein.

Portion of circuit design 200 includes gates G0-G3. The output of driver gate G0 is electrically connected by routed wires to the inputs of gates G1-G3. The wires are routed according to the physical topology shown in FIG. 2A. As shown in the figure, the output of driver gate G0 drives three input loads: the inputs of gates G1-G3. The load capacitances (i.e., input capacitances) of gates G1, G2, and G3 are C1, C2, and C3, respectively.

Figure 2B:
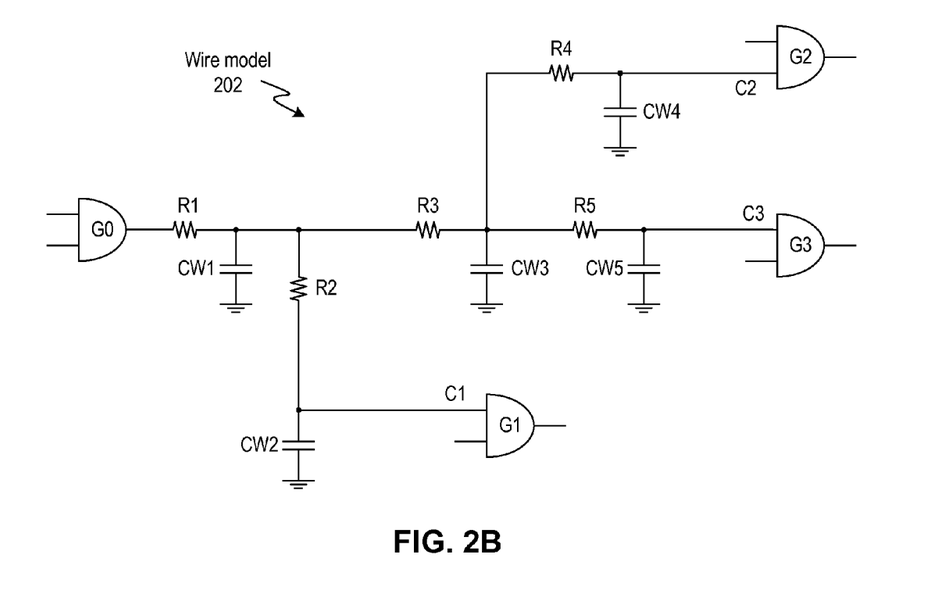
FIG. 2B illustrates how incremental Elmore delay can be calculated for the net shown in FIG. 2A accordance with some embodiments described herein.

FIG. 2B illustrates how incremental Elmore delay can be calculated for the net shown in FIG. 2A in accordance with some embodiments described herein.

Each of the routed wire segments shown in FIG. 2A can be modeled using a resistance and a capacitance. In some embodiments, a parasitic extraction tool can be used to generate a wire model for a given net. For example, wire model 202 models the physical wire topology shown in FIG. 2A and includes resistances R1-R5 and capacitances CW1-CW5. Wire model 202 has been shown in FIG. 2B is for illustration purposes only. Embodiments described herein are generally applicable to any wire model that uses a network of resistances and capacitances to model the electrical behavior of a physical wire topology.

The Elmore delays are computed using the resistances along the path to a load pin. Each of the resistances along the path from the driver to a load contributes to the wire delay to that load. Specifically, the delay due to resistance $R_i$ is given by $R_i \cdot \Sigma C_j$, where $\Sigma C_j$ is the total downstream capacitance seen by $R_i$. The summation of the delay contributed by each of these resistances along a path from the driver to the load pin constitutes the Elmore delay from the driver pin to that load pin.

For example, the Elmore delay dw1 that corresponds to the delay from the output of the driver gate G0 to the input pin of gate G1 can be computed as follows:

$$dw1 = R1 \cdot (CW1 + CW2 + CW3 + CW4 + CW5 + C1 + C2 + C3) + R2 \cdot (CW2 + C1). \quad (1)$$

The term "Elmore delay" refers to a delay that is computed in accordance with the Elmore delay model, which was described in Elmore, W. C., "The transient response of damped linear network with particular regard to wideband amplifiers," J. Applied Physics, 19:55-63, 1948. Equation (1) shown above is an example of an Elmore delay calculation.

It is clear from Equation (1) that if gates G1, G2, or G3 are replaced during optimization, the delay dw1 will have to be re-computed if an accurate wire delay value is desired. It is computationally expensive to compute the Elmore delay using the above expression every time a gate is changed during circuit optimization. Therefore, conventional physical synthesis systems either do not re-compute the wire delay and/or use an approximation to adjust the wire delay when a gate is replaced.

In contrast to conventional physical synthesis systems, some embodiments described herein provide a computationally efficient technique for determining the exact Elmore delay. Therefore, some embodiments described herein can be used to accurately determine the Elmore delay every time a gate is replaced during circuit optimization, thereby improving the accuracy and the quality of results produced by the physical synthesis system.

Specifically, the terms in Equation (1) can be rearranged as follows:

$$dw1 = \{R1 \cdot (CW1+CW2+CW3+CW4+CW5) + R2 \cdot CW2\} + (R1+R2) \cdot C1 + R1 \cdot C2 + R1 \cdot C3. \quad (2)$$

The rearrangement of terms allows the Elmore delay expression to be represented as follows: $dw1 = \tau1 + B11 \cdot C1 + B12 \cdot C2 + B13 \cdot C3$, where, $$\tau1 = R1 \cdot (CW1+CW2+CW3+CW4+CW5) + R2 \cdot CW2,$$

$$B11 = (R1+R2),$$

$$B12 = R1,$$

and $$B13 = R1. \quad (3)$$

Note that the coefficients $\tau1$, $B11$, $B12$, and $B13$ are constants, i.e., they are not dependent on the input capacitances of gates G1-G3. Specifically, the coefficients $\tau1$, $B11$, $B12$, and $B13$ do not need to be changed as long as the physical topology of the routed net does not change. Therefore, coefficients $\tau1$, $B11$, $B12$, and $B13$ can be computed once (e.g., at the beginning of the iterative optimization loop), and thereafter they can be used without any changes even when gates G1, G2, and G3 are replaced with functionally equivalent gates that have different input capacitances. Similar expressions can be determined for the delays dw2 and dw3 that correspond to the delays from the output of the driver gate G0 to the input pins of gates G2 and G3, respectively.

In general, the delay expressions for the delay from the output of driver gate G0 to the inputs of gates G1-Gn (which have input capacitances C1-Cn, respectively) can be expressed compactly using the matrix expression $dw = B \cdot C + \tau$, where matrix B, and vectors dw, C, and $\tau$ are defined as follows:

$$dw = \begin{bmatrix} dw1 \\ dw2 \\ \vdots \\ dwn \end{bmatrix}, B = \begin{bmatrix} B11 & B12 & \ldots & B1n \\ B21 & B22 & \ldots & B2n \\ \vdots & \vdots & \vdots & \vdots \\ Bn1 & Bn2 & \ldots & Bnn \end{bmatrix}, C = \begin{bmatrix} C1 \\ C2 \\ \vdots \\ Cn \end{bmatrix}, \text{ and } \tau = \begin{bmatrix} \tau1 \\ \tau2 \\ \vdots \\ \tau n \end{bmatrix}.$$

The elements of matrix B and vector $\tau$ can be computed using the approach that was described above. As mentioned before, the elements of matrix B and vector $\tau$ do not change as long as the physical topology of the net does not change. Once matrix B and vector $\tau$ have been determined, they can be stored, and can then be used for incrementally determining all the pin-to-pin Elmore delays during circuit optimization, with minimal computation.

The $r^{th}$ row of matrix B includes coefficients corresponding to the wire delay to the $r^{th}$ load (e.g., the input of gate Gr). The element in the $r^{th}$ row and the $c^{th}$ column of matrix B represents the summation of the resistances along the path from the driver (e.g., output of driver gate G0) to the $r^{th}$ load (e.g., the input of gate Gr) that see the $c^{th}$ load pin as a downstream capacitance. The $r^{th}$ row of the vector $\tau$ represents a summation of products, where each product is a resistance along the path from the driver to the $r^{th}$ load multiplied by the downstream wire capacitance seen by that resistance.

Matrix B and vector $\tau$ can significantly reduce the amount of computation required to accurately and incrementally compute all the pin-to-pin Elmore delays for all nets connected to the input pins of a gate that is sized. When the size of a gate is changed, the input pin capacitances of the gate changes. In conventional physical synthesis systems, this requires re-computation of the pin-to-pin wire delay to all the load pins from the driver pin. As mentioned above, this re-computation operation is computationally very expensive. Some embodiments described herein incrementally re-compute the pin-to-pin wire delays by only changing the component of the delay that is affected by the capacitance that is changed because of gate sizing, as illustrated in the following example with reference to FIG. 2B. Suppose gate G2 is changed, and let the new capacitance be C2'. Some embodiments determine the new delay values dw1, dw2, and dw3 using the following expressions:

$$C\text{diff} = C2' - C2,$$

$$dw1 = dw1 + B12 \cdot C\text{diff},$$

$$dw2 = dw2 + B22 \cdot C\text{diff},$$

$$dw3 = dw3 + B32 \cdot C\text{diff}. \quad (4)$$

Clearly, the computation required for evaluating the above incremental expressions is minimal compared to re-computing the Elmore delay that was described in Equation (1).

Figure 3:
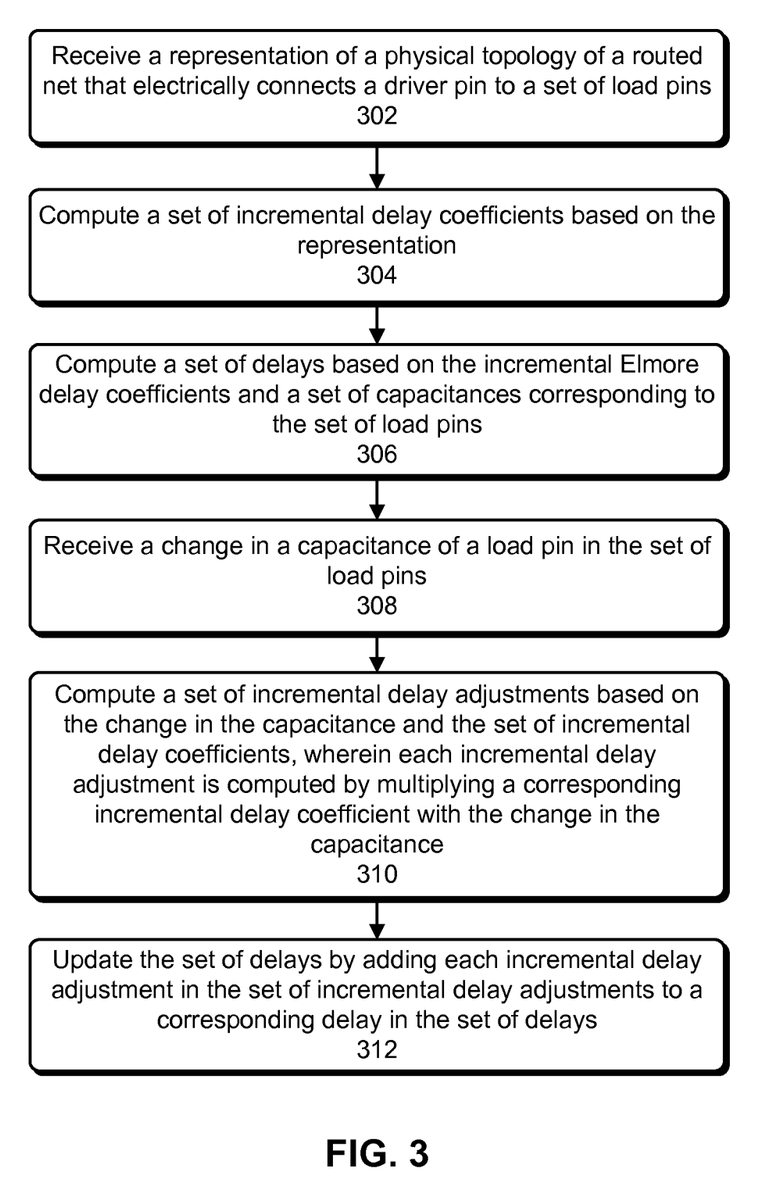
FIG. 3 illustrates a process for computing incremental Elmore delay coefficients in accordance with some embodiments described herein.

FIG. 3 illustrates a process for computing incremental Elmore delay coefficients in accordance with some embodiments described herein.

The process begins with receiving a representation of a physical topology of a routed net that electrically connects a driver pin to a set of load pins (operation 302). The process then computes a set of incremental Elmore delay coefficients based on the representation (operation 304). Next, a set of Elmore delays is computed based on the set of Elmore delay coefficients and a set of capacitances corresponding to the set of load pins (operation 306). Next, the process receives a change in a capacitance of a load pin in the set of load pins (operation 308). Next, a set of incremental delay adjustments is computed based on the change in the capacitance and the set of incremental Elmore delay coefficients, wherein each incremental delay adjustment is computed by multiplying a corresponding incremental delay coefficient with the change in the capacitance (operation 310). The process then updates the set of delays by adding each incremental delay adjustment in the set of incremental delay adjustments to a corresponding delay in the set of delays (operation 312). This incremental delay adjustment essentially has the effect of subtracting from the original delay, only the delay component corresponding to the old pin capacitance associated with the changing pin, and adding to the original delay, only the delay component corresponding to the new pin capacitance associated with the changing pin.

In some embodiments, the physical topology of a routed net is represented as a tree. The tree starts from the root driver node and ends at each of the load pins. A node in the tree is either a parent node or a child node. In general, the root driver node does not have a parent node, and has several children nodes. An intermediate node in the tree has a single parent node and possibly some children nodes. A leaf node represents a load pin and does not have any children nodes. Every node has a resistance and a capacitance associated with it which represents the resistance and capacitance of the wire segment driven by the node in the tree.

In some embodiments, a depth-first traversal of the tree is performed and the relevant information is computed as follows. The process computes an array of node structures for nodes on the path from the root driver node to each load pin. Note that a separate array is computed for each load pin. A node structure has the following information: (1) the wire resistance of the node, (2) a list of the load pins that are in the transitive fanout of the node, (3) the sum of the wire capacitances seen in the transitive fanout of the node, and (4) the sum of the wire resistances seen in the transitive fanout of the node (including the resistance of the node itself).

A recursive procedure can be used to perform this depth-first traversal of the wire segment tree. A node structure is created and initialized with its wire resistance, when a new node is encountered. The total wire capacitance in the transitive fanout of the node is also initialized with the wire capacitance of the node.

On the tail of the recursion (i.e., when a recursive call returns), the following operations are performed: (1) for a leaf load pin node, the node structures of all nodes in the node stack that are visited to reach the load pin are added to the array associated with the load pin, and the load pin is also added to the array of load pins in the transitive fanout of the load pin node; (2) for leaf and non-leaf pin nodes (except the root driver node), (2a) all the transitive fanout loads reachable from the node are added as being reachable from the parent of the node, (2b) the transitive fanout wire capacitance of the parent node is incremented by the transitive fanout wire capacitance of the node, and (2c) the transitive fanout wire resistance of the parent node is incremented by the transitive fanout wire resistance of the node.

Note that the traversal of the tree (e.g., the depth-first traversal) takes O(n) time. Although a depth-first traversal was used in the embodiment described above, other embodiments can visit the nodes in the tree in a different order. Once the node array has been created as explained above, matrix B and vector $\tau$ are initialized to zero, and then the values of the elements are determined using the following pseudo-code (in the following pseudo-code, all load pins are indexed from 0 to <number of load pins−1>).

```
row_idx = 0;
Foreach (load pin) {
    Node_ar = array of node structures for nodes in the path
        from driver root node to load pin;
    Foreach (node in Node_ar) {
        Foreach (load pins in transitive fanout of node) {
            col_idx = index of load pin;
            B[row_idx] [col_idx] += node resistance;
        }
        [row_idx] += (node resistance) * (transitive fanout
            wire capacitance of node);
    }
}
```

Figure 4:
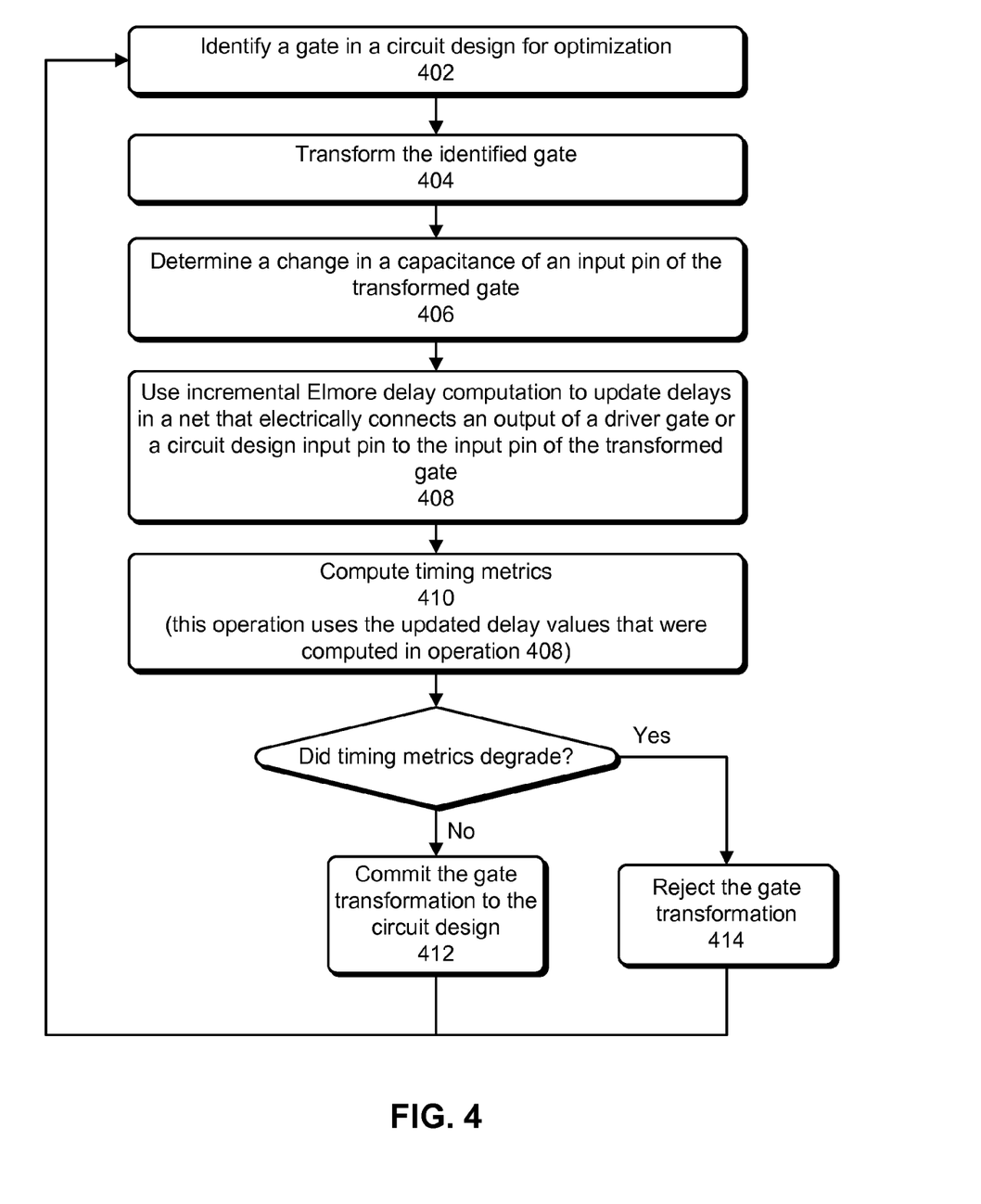
FIG. 4 illustrates a process for optimizing a circuit design using incremental Elmore delay computation in accordance with some embodiments described herein.

FIG. 4 illustrates a process for optimizing a circuit design using incremental Elmore delay computation in accordance with some embodiments described herein.

The process begins by identifying a gate in a circuit design for optimization (operation 402). Next, the identified gate is transformed (operation 404). In some embodiments described herein, transforming a gate involves replacing the gate with another functionally equivalent gate from a library of gates. In other embodiments, transforming a gate involves (1) replacing a gate with an equivalent circuit (e.g., replacing a NAND gate with an AND gate followed by an inverter), and then (2) replacing the gates in the equivalent circuit with other functionally equivalent gates from a library of gates. The library of gates typically contains a set of equivalent gates that have different area, leakage, and delay characteristics.

A change in a capacitance of an input pin of the transformed gate is then determined (operation 406). Incremental Elmore delay computation (e.g., as shown in Equation (4)) is then used to update delays in a net that electrically connects an output of a driver gate or a circuit design input pin to the input pin of the transformed gate (operation 408). For example, the techniques and systems described above can be used to perform incremental Elmore delay computations.

One or more timing metrics are then computed (operation 410). The timing metric computations in operation 410 use the updated delay values that are computed in operation 408. If one or more timing metrics degraded, then the gate transformation is rejected (operation 414). On the other hand, if none of the timing metrics degraded, then the gate transformation is committed to the circuit design (operation 412). The process then returns (if a termination condition has not been met) to operation 402 to identify another gate for optimization.

The incremental Elmore delay computations described in this disclosure can generally be used in any circuit optimization technique that requires a computationally efficient technique to accurately determine Elmore delays. Specifically, some embodiments described herein can be used in numerical solver based circuit optimization techniques that use a numerical solver to output an optimized circuit design.

Figure 5:
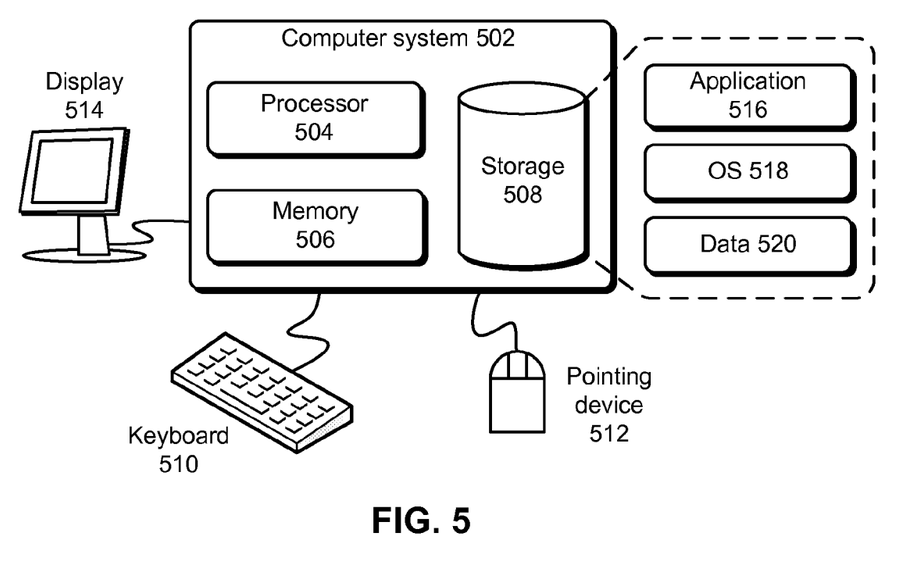
FIG. 5 illustrates a computer system in accordance with an embodiment of the present invention.

FIG. 5 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 502 comprises processor 504, memory 506, and storage 508. Computer system 502 can be coupled with display 514, keyboard 510, and pointing device 512. Storage 508 can generally be any device that can store data. Specifically, a storage device can be a magnetic, an optical, or a magneto-optical storage device, or it can be based on flash memory and/or battery-backed up memory. Storage 508 can store application 516, operating system 518, and data 520.

Application 516 can include instructions that when executed by computer 502 cause computer 502 to perform one or more processes that are implicitly or explicitly described in this disclosure. Data 520 can include any data that is inputted into or outputted by application 516.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for incrementally updating a set of Elmore pin-to-pin delays for a routed net that electrically connects a driver pin to a set of load pins, the method comprising:
   receiving a representation of a physical topology of the routed net that electrically connects the driver pin to the set of load pins;
   computing a set of incremental Elmore delay coefficients based on the representation, wherein the incremental Elmore delay coefficients do not need to be changed as long as the physical topology of the routed net does not change;
   receiving a change in a capacitance of a load pin in the set of load pins;
   computing, by using a computer, a set of incremental Elmore pin-to-pin delay adjustments based on the change in the capacitance and the set of incremental Elmore delay coefficients, wherein each incremental Elmore pin-to-pin delay adjustment is computed by multiplying a corresponding incremental Elmore delay coefficient with the change in the capacitance; and
   updating the set of Elmore pin-to-pin delays by adding each incremental Elmore pin-to-pin delay adjustment in the set of incremental Elmore pin-to-pin delay adjustments to a corresponding Elmore pin-to-pin delay in the set of Elmore pin-to-pin delays.

2. The method of claim 1, wherein the representation of the physical topology of the routed net is a tree.

3. The method of claim 2, wherein the root of the tree corresponds to the driver pin, and each leaf node in the tree corresponds to a load pin.

4. The method of claim 3, wherein said computing the set of incremental Elmore pin-to-pin delay coefficients includes performing a traversal of the tree starting with the root of the tree, wherein the traversal of the tree takes O(n) time, where n is the number of nodes in the tree, wherein each node in the tree corresponds to a wire segment, and wherein each node includes a wire resistance associated with the wire segment, a list of load pins that are in a transitive fanout of the node, a sum of wire capacitances seen in the transitive fanout of the node, and a sum of the wire resistances seen in the transitive fanout of the node including the wire resistance of the node.

5. The method of claim 1, wherein the change in the capacitance of the load pin is a result of a gate transformation that is performed during circuit optimization.

6. The method of claim 5, wherein the method further comprises using the updated set of delays to compute one or more timing metrics.

7. The method of claim 6, wherein the method further comprises:
   committing the gate transformation if none of the timing metrics degraded; and
   rejecting the gate transformation if one or more timing metrics degraded.

8. A non-transitory computer-readable storage medium storing instructions that, when executed by a computer, cause the computer to perform a method for incrementally updating a set of Elmore pin-to-pin delays for a routed net that electrically connects a driver pin to a set of load pins, the method comprising:
   receiving a representation of a physical topology of the routed net that electrically connects the driver pin to the set of load pins;
   computing a set of incremental Elmore delay coefficients based on the representation, wherein the incremental Elmore delay coefficients do not need to be changed as long as the physical topology of the routed net does not change;
   receiving a change in a capacitance of a load pin in the set of load pins;
   computing a set of incremental Elmore pin-to-pin delay adjustments based on the change in the capacitance and the set of incremental Elmore delay coefficients, wherein each incremental Elmore pin-to-pin delay adjustment is computed by multiplying a corresponding incremental Elmore delay coefficient with the change in the capacitance; and
   updating the set of Elmore pin-to-pin delays by adding each incremental Elmore pin-to-pin delay adjustment in the set of incremental Elmore pin-to-pin delay adjustments to a corresponding Elmore pin-to-pin delay in the set of Elmore pin-to-pin delays.

9. The non-transitory computer-readable storage medium of claim 8, wherein the representation of the physical topology of the routed net is a tree.

10. The non-transitory computer-readable storage medium of claim 9, wherein the root of the tree corresponds to the driver pin, and each leaf node in the tree corresponds to a load pin.

11. The non-transitory computer-readable storage medium of claim 10, wherein said computing the set of incremental Elmore delay coefficients includes performing a traversal of the tree starting with the root of the tree, wherein the traversal of the tree takes O(n) time, where n is the number of nodes in the tree, wherein each node in the tree corresponds to a wire segment, and wherein each node includes a wire resistance associated with the wire segment, a list of load pins that are in a transitive fanout of the node, a sum of wire capacitances seen in the transitive fanout of the node, and a sum of the wire resistances seen in the transitive fanout of the node including the wire resistance of the node.

12. The non-transitory computer-readable storage medium of claim 8, wherein the change in the capacitance of the load pin is a result of a gate transformation that is performed during circuit optimization.

13. The non-transitory computer-readable storage medium of claim 12, wherein the method further comprises using the updated set of delays to compute one or more timing metrics.

14. The non-transitory computer-readable storage medium of claim 13, wherein the method further comprises:
   committing the gate transformation if none of the timing metrics degraded; and
   rejecting the gate transformation if one or more timing metrics degraded.

15. A computer system, comprising:
   a processor; and
   a non-transitory computer-readable storage medium storing instructions that, when executed by a computer, cause the computer to perform a method for incrementally updating a set of Elmore pin-to-pin delays for a routed net that electrically connects a driver pin to a set of load pins, the method comprising:
      receiving a representation of a physical topology of the routed net that electrically connects the driver pin to the set of load pins;
      computing a set of incremental Elmore delay coefficients based on the representation, wherein the incremental Elmore delay coefficients do not need to be changed as long as the physical topology of the routed net does not change;
      receiving a change in a capacitance of a load pin in the set of load pins;
      computing a set of incremental Elmore pin-to-pin delay adjustments based on the change in the capacitance and the set of incremental Elmore delay coefficients, wherein each incremental Elmore pin-to-pin delay adjustment is computed by multiplying a corresponding incremental Elmore delay coefficient with the change in the capacitance; and
      updating the set of Elmore pin-to-pin delays by adding each incremental Elmore delay adjustment in the set of incremental Elmore pin-to-pin delay adjustments to a corresponding Elmore pin-to-pin delay in the set of Elmore pin-to-pin delays.

16. The computer system of claim 15, wherein the representation of the physical topology of the routed net is a tree.

17. The computer system of claim 16, wherein the root of the tree corresponds to the driver pin, and each leaf node in the tree corresponds to a load pin.

18. The computer system of claim 17, wherein said computing the set of incremental Elmore delay coefficients includes performing a traversal of the tree starting with the root of the tree, wherein the traversal of the tree takes O(n) time, where n is the number of nodes in the tree, wherein each node in the tree corresponds to a wire segment, and wherein each node includes a wire resistance associated with the wire segment, a list of load pins that are in a transitive fanout of the node, a sum of wire capacitances seen in the transitive fanout of the node, and a sum of the wire resistances seen in the transitive fanout of the node including the wire resistance of the node.

19. The computer system of claim 15, wherein the change in the capacitance of the load pin is a result of a gate transformation that is performed during circuit optimization.

20. The computer system of claim 19, wherein the instructions further include additional instructions that, when executed by the processor, cause the computer system to:
   use the updated set of delays to compute one or more timing metrics;
   commit the gate transformation if none of the timing metrics degraded; and
   reject the gate transformation if one or more timing metrics degraded.

* * * * *